May 29, 1934.　　　　R. C. GRIFFITH　　　　1,960,995
REGENERATIVE RECTIFIER SYSTEM
Original Filed Oct. 26, 1932　　2 Sheets-Sheet 2
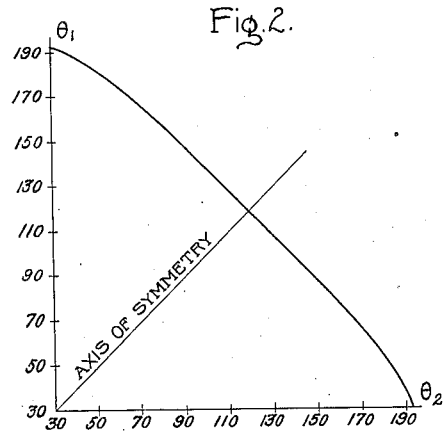
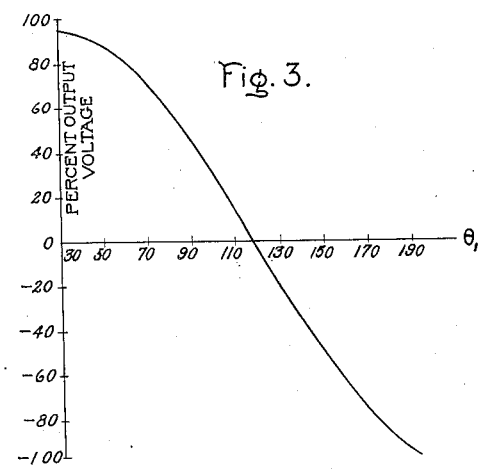
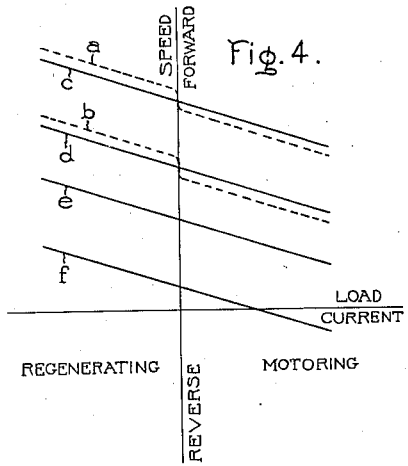
Inventor:
Rolland C. Griffith,
by
His Attorney.

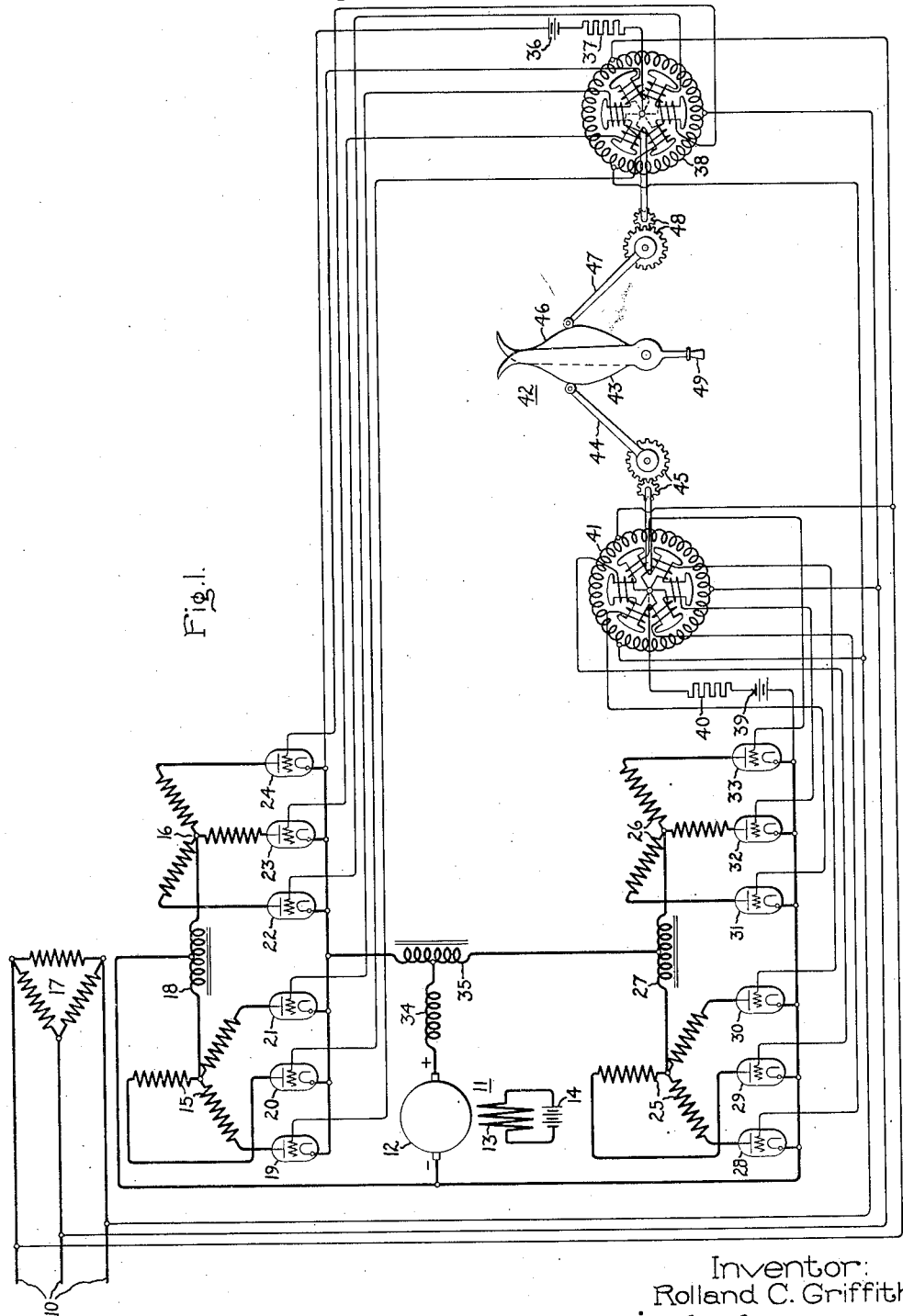

Patented May 29, 1934

1,960,995

UNITED STATES PATENT OFFICE 1,960,995

REGENERATIVE RECTIFIER SYSTEM

Rolland C. Griffith, Schenectady, N. Y., assignor to General Electric Company, a corporation of New York Application October 26, 1932, Serial No. 639,680
Renewed November 17, 1933

7 Claims. (Cl. 171—97)

My invention relates to electric valve converting apparatus and more particularly to such apparatus suitable for use as a regenerative rectifier, that is, an arrangement for transmitting energy between an alternating current supply circuit and a regenerative load circuit.

It has heretofore been proposed to transmit energy between an alternating current supply circuit and a regenerative load circuit by means of two electric valve converting apparatus, one connected to transmit energy from the alternating current circuit to the direct current circuit and the other connected to transmit energy from the direct current circuit to the alternating current circuit, and controlling the two converting apparatus so that energy will flow from the supply circuit to the load circuit when the counter-electromotive force of the load circuit is below a predetermined value, and in an opposite direction when the counter-electromotive force of the load circuit rises above that value. With such an arrangement, however, current will not ordinarily reverse until the counter-electromotive force has changed by an amount equal to substantially twice the voltage drop across the electric valves. If, however, a circulating current be maintained between the two converting apparatus under light load conditions, the transition from rectifying to regenerating, or vice versa, may be effected smoothly and without any discontinuity. Thereafter, the circulating current will decrease substantially as the load current increases. For the most satisfactory operation of such an apparatus it is desirable that the value of the circulating current at no load should be substantially the same, irrespective of the ratio of the voltages of the supply and load circuit; that is, irrespective of the control of the rectifying and inverting apparatus to control the energy transmitted between the circuits. My invention relates more specifically to a regenerative rectifier system having the above mentioned characteristics.

It is an object of my invention, therefore, to provide an improved regenerative rectifier system for transmitting energy between an alternating current supply circuit and a regenerative load circuit comprising an electric valve converting apparatus for transmitting energy from the supply circuit to the load circuit, a second electric valve converting apparatus for transmitting energy from the load circuit to the supply circuit, and means for varying the ratio of the voltages of the circuit, in which a circulating current will be maintained between the two converting apparatus under predetermined load conditions and in which the circulating current will be substantially constant irrespective of variations in the ratio of the voltages of the circuits.

In accordance with one embodiment of my invention, an alternating current supply circuit is interconnected with a direct current regenerative load circuit through an electric valve rectifying apparatus for transmitting energy from the alternating current circuit to the load circuit and an electric valve inverting apparatus for transmitting energy from the load circuit to the alternating current supply circuit. The control grids of the valves of each electric valve converting apparatus are excited from the alternating current circuit through a rotary phase shifting transformer and the two rotary phase shifting transformers are simultaneously actuated by a cam operating mechanism which is effective to produce a constant no-load voltage difference between the direct current circuit of the rectifying and inverting apparatus, and this voltage is effective to produce a circulating current between the two apparatus which is substantially constant irrespective of the variations in the ratio of the voltages of the supply and load circuit.

For a better understanding of my invention, together with other and further objects thereof, reference is had to the following description taken in connection with the accompanying drawings, and its scope will be pointed out in the appended claims. Fig. 1 of the drawings illustrates an arrangement embodying my invention for transmitting energy between a three-phase alternating current supply circuit and a regenerative direct current motor, while Figs. 2, 3, and 4 represent certain operating characteristics of the arrangement illustrated in Fig. 1.

Referring now more particularly to Fig. 1 of the drawings, there is illustrated an arrangement for transmitting energy between a three-phase alternating current supply circuit 10 and a direct current motor 11 comprising an armature 12 and a field winding 13 energized from any suitable source, such for example, as a battery 14. The armature 12 of the motor 11 is connected to be energized from the supply circuit 10 through a double three phase rectifying apparatus comprising the three-phase star connected secondary networks 15 and 16 of a polyphase transformer, the primary network 17 of which is connected to the circuit 10. The electrical neutrals of the networks 15 and 16 are interconnected through an interphase transformer 18 provided with an electrical midpoint connected to the negative terminal of the armature winding 12, while the several terminals of the networks 15 and 16 are connected to the other terminal of the armature winding 12 through electric valves 19–24, inc. The armature 12 is also connected to transmit energy to the supply circuit 10 through an inverting apparatus comprising the three-phase star connected secondary networks 25 and 26 inductively related to the primary network 17. Similarly, the electrical neutrals of the networks 25 and 26 are interconnected through an interphase transformer 27 provided with an electrical midpont connected to the positive terminal of the armature 12. The end terminals of the networks 25 and 26 are connected to the negative terminal of the armature 12 through electric valves 28–33 inc. The electric valves 19–24 inc. and 28–33 inc. are each provided with an anode, a cathode, and a control grid, and may be of any of the several types well known in the art, although I prefer to use valves of the vapor electric discharge type. A current smoothing reactor 34 is preferably included in circuit with the armature winding 12, while the direct current circuits of the rectifying and inverting apparatus are preferably coupled through an inductive winding or reactor 35 interconnecting the electrical neutral of the interphase transformer 27 with the common cathode circuit of the electric valves 19–24 inc. and provided with an electrical midpoint for connection to the positive terminal of the armature winding 12.

While I have described my invention as embodied in an arrangement comprising a double three-phase rectifying apparatus and a double three-phase inverting apparatus including separate transformer windings, it will be obvious to those skilled in the art that my invention is equally applicable to a regenerative rectifying system utilizing rectifying and inverting apparatus of any of the several well known connections, which may or may not embody a common transformer network or networks.

The grids of the electric valves 19–24 inc. are connected to their common cathode circuit through a negative bias battery 36, a current limiting resistor 37, and corresponding phases of the secondary winding of a rotary phase shifting transformer 38, the primary winding of which is energized from the alternating current circuit 10. Similarly, the grids of electric valves 28–33, inc. are connected to their common cathode circuit through a negative bias battery 39, a current limiting resistor 40, and the corresponding phases of the secondary winding of a rotary phase shifting transformer 41, the primary winding of which is also energized from the alternating current circuit 10. It will be well understood by those skilled in the art that the potentials supplied to the grids of the electric valves 19–24 inc. and 28–33 inc. by the rotary phase shifting transformers 38 and 41 should be of a peaked wave form, or means should be interposed between these transformers and their associated grids for converting the grid potentials into waves of peaked wave form, such for example as saturating grid transformers, or the negative bias batteries 36 and 39 should have such a potential as to limit the periods of positive excitation of the grid of each of the several valves to a period somewhat less than 120 electrical degrees, the normal period of conductivity of each of the valves.

As stated above, in order to maintain a circulating current under light load conditions, the difference in the no-load voltages of the rectifying and inverting apparatus must be sufficient to overcome the voltage drop of the tubes of the rectifying and inverting apparatus and maintain a circulating current in these apparatus against the impedance drop of the circuit elements. For most satisfactory operating conditions, this difference in the no-load voltages of the rectifying and inverting apparatus should remain constant irrespective of the ratio of the voltages of the supply circuit and the load circuit; that is, irrespective of the phase of the grid potentials applied to the valves of the rectifying and inverting apparatus. Such a control may be effected by means of a cam operating mechanism 42 provided with a cam surface 43 and follower 44 connected to the rotating member of the phase shifting transformer 41 through a pair of gears 45, and a cam surface 46 and follower 47 connected to the rotary member of the rotary phase shifting transformer 38 through a pair of gears 48. The followers 44 and 47 may be maintained in engagement with the cam surfaces 43 and 46, respectively, through any suitable biasing means (not illustrated) and the mechanism as a whole may be operated by means of a lever 49.

The general principles of operation of the above described regenerative rectifying system will be well understood by those skilled in the art. In brief, under normal operating conditions, current is supplied from the alternating current circuit 10 to the motor 11 through the rectifying apparatus including electric valves 19–24 inc. The energy transmitted to the motor 11, and thus its speed, may be controlled, as is well understood by those skilled in the art, by retarding the phase of the grid potentials of the electric valves 19–24 inc. and thus reducing the average voltage impressed upon the armature circuit 12. Neglecting the circulating current between the rectifying and inverting apparatus, and assuming that the grid potentials of the rectifying and inverting apparatus are shifted simultaneously and substantially equally for any given setting of the rotary phase shifting transformers 38 and 41, if the motor 11 be driven by its connected load at such a speed that its generated counter-electromotive force exceeds the average voltage of the rectifying apparatus, the flow of energy from the supply circuit 10 to the motor 11 will cease and the motor will transmit energy to the supply circuit 10 through the inverting apparatus comprising electric valves 28–33 inc. It will be understood, of course, that the grid potentials of the electric valves 28–33 inc. must be advanced with respect to their anode potentials by an angle equal at least to the commutating angle, in order that the electromotive force of the networks 25 and 26 shall be effective to commutate the current between the several electric valves. In such an arrangement the smoothing reactor 34 tends to maintain the unidirectional current to or from the armature windings substantially steady. The coupling reactor 35 also aids in maintaining the load on the motor 11 constant, as any sudden increase in load to the upper portion of the reactor 35 while the apparatus is operating as a rectifier, will induce a voltage in the lower portion of this winding which will assist the inverting apparatus in returning energy to the alternating current supply circuit 10, thus increasing the effective impedance of the rectifying apparatus.

The operation of the above described apparatus to maintain a constant circulating current through the rectifying and inverting apparatus irrespective of the value of the output voltage of the rectifying apparatus will be best understood by reference to the following explanation which is developed with reference to the general case of a polyphase rectifier of P phases.

Assuming that the apparatus is operating as a rectifier, the average voltage delivered by the rectifying apparatus to the armature winding 12 is:

$$E_1 = A[\sin(\theta_1 + \pi/p) - B(I + I_o)] - R(I + I_o) - D \quad (1)$$

Where $$A = \sqrt{2}\, Ep/\pi \sin \pi/p$$

$$B = \frac{X}{2\sqrt{2}\, E} \sin \pi/p$$

$E = $ R. M. S. voltage per phase of the networks 15 and 16.
$I = $ average load current.
$I_o = $ average circulating current.
$\theta_1 = $ grid phase angle (lagging) of rectifier
$X = $ transformer reactance per phase
$R = $ transformer resistance per phase
$D = $ voltage drop across an electric valve
$p = $ number of phases of each anode group dividing the conducting cycle between them e. g. in the case of the double three phase connection described above, $p = 3$.

Similarly, the average inverter voltage necessary to transmit the circulating current from the output circuit of the rectifying apparatus to the supply circuit 10 is:

$$E_2 = A[\sin(\theta_2 + \pi/p) - BI_o] - RI_o - D \quad (2)$$

Where $\theta_2 = $ grid phase angle (lagging) of inverter. The sum of these voltages is zero, that is, $$E_1 + E_2 = 0 \quad (3)$$

At no load, it is required that the circulating current $I_o$ be a constant. Substituting Equations (1) and (2) in (3) and $I = 0$ gives:

$$\sin(\theta_1 + \pi/p) + \sin(\theta_2 + \pi/p) =$$

$$\frac{2ABI_o + 2RI_o + 2D}{A} = K, \text{ a constant} \quad (4)$$

The circulating current should be sufficient to reduce the voltage drop of the electric valves to their normal or minimum value, in case valves of the vapor electric discharge type are used. The value of K is, of course, determined by the value of circulating current desired, the constants of the circuit and the normal voltage drop of the electric valves. In the apparatus tested, it was found that the value of K was approximately 0.05. The relation between $\theta_1$ and $\theta_2$ for the double three phase connection illustrated, as expressed by the equation $$\sin(\theta_1 + 60°) + \sin(\theta_2 + 60°) = 0.05$$

has been plotted in Fig. 2 of the drawings. From this curve the corresponding values of grid phase shift of the rectifying and inverting valves may be obtained. For other circuit constants and other values of circulating current, other similar curves may be obtained. It will be noted that the curve of Fig. 2 is symmetrical about the axis indicated. Where this axis crosses the curve it will be noted that both $\theta_1$ and $\theta_2$ have the value of 118.5° which corresponds to zero motor speed and zero output voltage. Points on one side of this intersection correspond to forward operation of the motor, while points on the other side correspond to reverse operation.

The relation between the grid phase angle of the rectifier or inverter valves, for example $\theta_1$, and the percentage no-load voltage of the output circuit may be found by rearranging Equation (1):

$$\frac{E_1}{A} = \sin(\theta_1 + \pi/p) - BI_o - \frac{R}{A}I_o - \frac{D}{A} =$$

$$\sin(\theta_1 + 60°) - C, \text{ a constant} \quad (5)$$

Since $\theta_1 = 118.5°$ when $E_1 = 0$, the value of C may be calculated as 0.0262. The relation between the percentage output voltage and the grid phase angle $\theta_1$ is plotted from Equation (5) in Fig. 3. From Figs. 2 and 3, the cam surfaces 43 and 46 of Fig. 1 may be determined. The cam surfaces illustrated are approximately to scale for the particular apparatus tested and are proportioned to give equal changes in voltage of the motor circuit for equal movements of the operating lever 49. The motion increasing gears 45 and 48 are for the purpose of obtaining a grid phase shift of substantially 180 degrees by a movement of the cam followers 44 and 47 through only 90 degrees, a result which may also be secured by utilizing four-pole phase shifting transformers 38 and 41. This considerably simplifies the design of the cam surfaces 43 and 46.

While I have described the determination of the cam surfaces 43 and 46 for a particular set of circuit constants and for a particular value of circulating current, it will be well understood by those skilled in the art that the above described method is equally applicable to the design of a regenerative rectifying system of any desired circuit constants and for any desired circulating current.

In Fig. 4 are illustrated copies of certain speed load curves taken with the apparatus illustrated in Fig. 1. The dotted curves $a$ and $b$ represent the variation of load current with speed when the grid phase angles of both the rectifying and inverting apparatus are varied equally and simultaneously. It will be noted that there is a decided discontinuity when changing from motoring to regenerating operation. The curves $c$, $d$, $e$, and $f$ of Fig. 4, however, are copies of speed load curves of the apparatus of Fig. 1 when a constant no-load circulating current is maintained through the rectifying and inverting apparatus. It will be noted that these curves contain no discontinuities but that there is a smooth transition from motoring to regenerating operation.

While I have described what I at present consider the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States, is:

1. A regenerative rectifier system comprising an alternating current supply circuit, a regenerative load circuit, electric valve converting apparatus interconnecting said circuits for transmitting energy from said supply circuit to said load circuit, a second electric valve converting apparatus also interconnecting said circuits for transmitting energy from said load circuit to said supply circuit, means for varying the ratio of the voltages of said circuits, means for maintaining a circulating current between said two converting apparatus only under predetermined load conditions and for maintaining said circulating current substantially constant independently of variations in the ratio of the voltages of said circuits.

2. A regenerative rectifier system comprising an alternating current supply circuit, a regenerative load circuit, electric valve converting apparatus interconnecting said circuits for transmitting energy from said supply circuit to said load circuit, a second electric valve converting apparatus also interconnecting said circuits for transmitting energy from said load circuit to said supply circuit, means for varying the ratio of the voltages of said circuits, and means for maintaining a circulating current between said two converting apparatus only when the current transmitted between said circuits drops below a predetermined value.

3. A regenerative rectifier system comprising an alternating current supply circuit, a regenerative load circuit, electric valve converting apparatus interconnecting said circuits for transmitting energy from said supply circuit to said load circuit, a second electric valve converting apparatus also interconnecting said circuits for transmitting energy from said load circuit to said supply circuit, means for varying the ratio of the voltages of said circuits, and means for maintaining a circulating current between said two converting apparatus only when the current transmitted between said circuits drops below a predetermined value and for maintaining said circulating current substantially constant for any given value of load current.

4. A regenerative rectifier system comprising an alternating current supply circuit, a regenerative load circuit, converting apparatus including a plurality of grid controlled electric valves interconnecting said circuits for transmitting energy from said supply circuit to said load circuit, a second converting apparatus including a plurality of grid controlled electric valves also interconnecting said circuits to transmit energy from said load circuit to said supply circuit, means for applying alternating potentials to the grids of the valves of each of said converting apparatus to control the energy transmitted therethrough, and means for simultaneously and unequally varying the phase of the alternating potentials applied to the grids of the valves of the two converting apparatus to control the energy transmitted between said circuits and simultaneously to control the circulating current flowing between said converting apparatus.

5. A regenerative rectifier system comprising an alternating current supply circuit, a regenerative load circuit, converting apparatus including a plurality of grid controlled electric valves interconnecting said circuits for transmitting energy from said supply circuit to said load circuit, a second converting apparatus including a plurality of grid controlled electric valves also interconnecting said circuits to transmit energy from said load circuit to said supply circuit, means for applying alternating potentials to the grids of the valves of each of said converting apparatus to control the energy transmitted therethrough, and means for varying the phase of the alternating potentials applied to the grids of the valves of the two converting apparatus in accordance with the following relation:

$$\sin(\theta_1+\pi/p) + \sin(\theta_2+\pi/p) = K$$

where $\theta_1$ and $\theta_2$ are the phase angles of the grid potentials of the two converting apparatus, $p$ is the number of phases of each group of valves dividing the conducting cycle between them, and $K$ is a constant.

6. A regenerative rectifier system comprising an alternating current supply circuit, a regenerative load circuit, converting apparatus including a plurality of grid controlled electric valves interconnecting said circuits for transmitting energy from said supply circuit to said load circuit, a second converting apparatus including a plurality of grid controlled electric valves also interconnecting said circuits to transmit energy from said load circuit to said supply circuit, means for applying alternating potentials to the grids of the valves of each of said converting apparatus to control the energy transmitted therethrough, and a cam mechanism for simultaneously and unequally varying the phase of the alternating potentials applied to the grids of the valves of the two converting apparatus.

7. A regenerative rectifier system comprising an alternating current supply circuit, a regenerative load circuit, converting apparatus including a plurality of grid controlled electric valves interconnecting said circuits for transmitting energy from said supply circuit to said load circuit, a second converting apparatus including a plurality of grid controlled electric valves also interconnecting said circuits to transmit energy from said load circuit to said supply circuit, a pair of rotary phase shifting transformers energized from the alternating current circuit, each connected to excite the grids of one of said converting apparatus, and a cam mechanism for operating said phase shifting transformers according to the relation:

$$\sin(\theta_1+\pi/p) + \sin(\theta_2+\pi/p) = K$$

where $\theta_1$ and $\theta_2$ are the phase angles of the grid potentials of the two converting apparatus, $p$ is the number of phases of each group of valves dividing the conducting cycle between them, and $K$ is a constant.

ROLLAND C. GRIFFITH.